United States Patent
Dylewski et al.

(10) Patent No.: US 9,053,564 B1
(45) Date of Patent: Jun. 9, 2015

(54) VIBRATION SENSING AND CANCELING ELECTRONICS

(75) Inventors: Scott M. Dylewski, San Francisco, CA (US); Heath Hunnicutt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 127 days.

(21) Appl. No.: 13/426,517

(22) Filed: Mar. 21, 2012

(51) Int. Cl.
G09G 5/00 (2006.01)
G06F 3/041 (2006.01)
G06T 11/00 (2006.01)
G06F 3/0485 (2013.01)
G06F 1/16 (2006.01)

(52) U.S. Cl.
CPC ........ G06T 11/00 (2013.01); G09G 2320/0261 (2013.01); G06F 3/0485 (2013.01); G06F 1/1694 (2013.01); G06F 2200/1637 (2013.01)

(58) Field of Classification Search
None
See application file for complete search history.

(56) References Cited

U.S. PATENT DOCUMENTS

| | | | |
|---|---|---|---|
| 2003/0095155 A1 | 5/2003 | Johnson | |
| 2004/0051783 A1* | 3/2004 | Chellappa et al. | 348/46 |
| 2006/0017692 A1* | 1/2006 | Wehrenberg et al. | 345/156 |
| 2006/0033879 A1* | 2/2006 | Covannon et al. | 351/221 |
| 2008/0218475 A1* | 9/2008 | Appleyard et al. | 345/158 |
| 2009/0112092 A1 | 4/2009 | Bae et al. | |
| 2009/0201246 A1* | 8/2009 | Lee et al. | 345/156 |
| 2010/0061659 A1 | 3/2010 | Slack et al. | |
| 2010/0079485 A1* | 4/2010 | Bentley | 345/619 |
| 2010/0103081 A1* | 4/2010 | Takasugi et al. | 345/45 |
| 2010/0224872 A1* | 9/2010 | Kimura | 257/43 |
| 2010/0302055 A1* | 12/2010 | Yaguchi | 340/825.25 |
| 2011/0037778 A1* | 2/2011 | Deng et al. | 345/661 |
| 2011/0299792 A1 | 12/2011 | Sakaguchi et al. | |
| 2013/0083196 A1 | 4/2013 | Zheng | |

OTHER PUBLICATIONS

Office Action for U.S. Appl. No. 13/426,452, mailed on Nov. 1, 2013, Heath Hunnicutt, "Vibration Sensing and Canceling for Displays", 20 pages.
Final Office Action for U.S. Appl. No. 13/426,452, mailed on Feb. 13, 2014, Heath Hunnicutt, "Vibration Sensing and Canceling for Displays", 23 pages.
Office action for U.S. Appl. No. 13/426,452, mailed on Jun. 27, 2014, Hunnicutt et al., "Vibration Sensing and Canceling for Displays", 26 pages.
Final Office Action for U.S. Appl. No. 13/426,452, mailed on Dec. 24, 2014, Heath Hunnicutt, "Vibration Sensing and Canceling for Displays", 27 pages.

* cited by examiner

Primary Examiner — Joni Richer
Assistant Examiner — Yi Wang
(74) Attorney, Agent, or Firm — Lee & Hayes, PLLC

(57) ABSTRACT

This disclosure is directed at least in part to sensing movement of an electronic display and canceling perceived movement of content on the electronic display in response to the sensing. A controller may reassign "physical pixels" to "image pixels" (or virtual pixels) such that the image appears to be stationary while the physical pixels are moving due to movement of the electronic display. For example, if the physical pixels are moving upward, the image pixels may be reassigned downward in an equal and opposite manner. The user's persistence of vision may then be reinforced by reassignment of the pixels by the display manager. For example, text displayed on the electronic display may be more readable and images more easily viewed by a user.

19 Claims, 7 Drawing Sheets

VIBRATION SENSING AND CANCELING ELECTRONICS

BACKGROUND

Electronic displays are commonly used in many different applications to enable users to receive or interact with information provided by an electronic device. For example, mobile telephones, laptop computers, tablet computers, automobile control systems, aircraft control systems, exercise equipment, navigational devices, and other types of electronic devices use electronic displays to provide information to a user and sometimes to receive information from the user (e.g., via a touch sensitive display).

Electronic displays are used in various environments and conditions, which may present different challenges when users are viewing information and content on the electronic displays. For example, when a user is viewing an electronic display in a moving vehicle or aircraft, the electronic display may vibrate or move in response to forces such as turbulence or an impact of a bump in a road. Such movement may make it difficult for a user to read text or otherwise interact with the electronic display.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
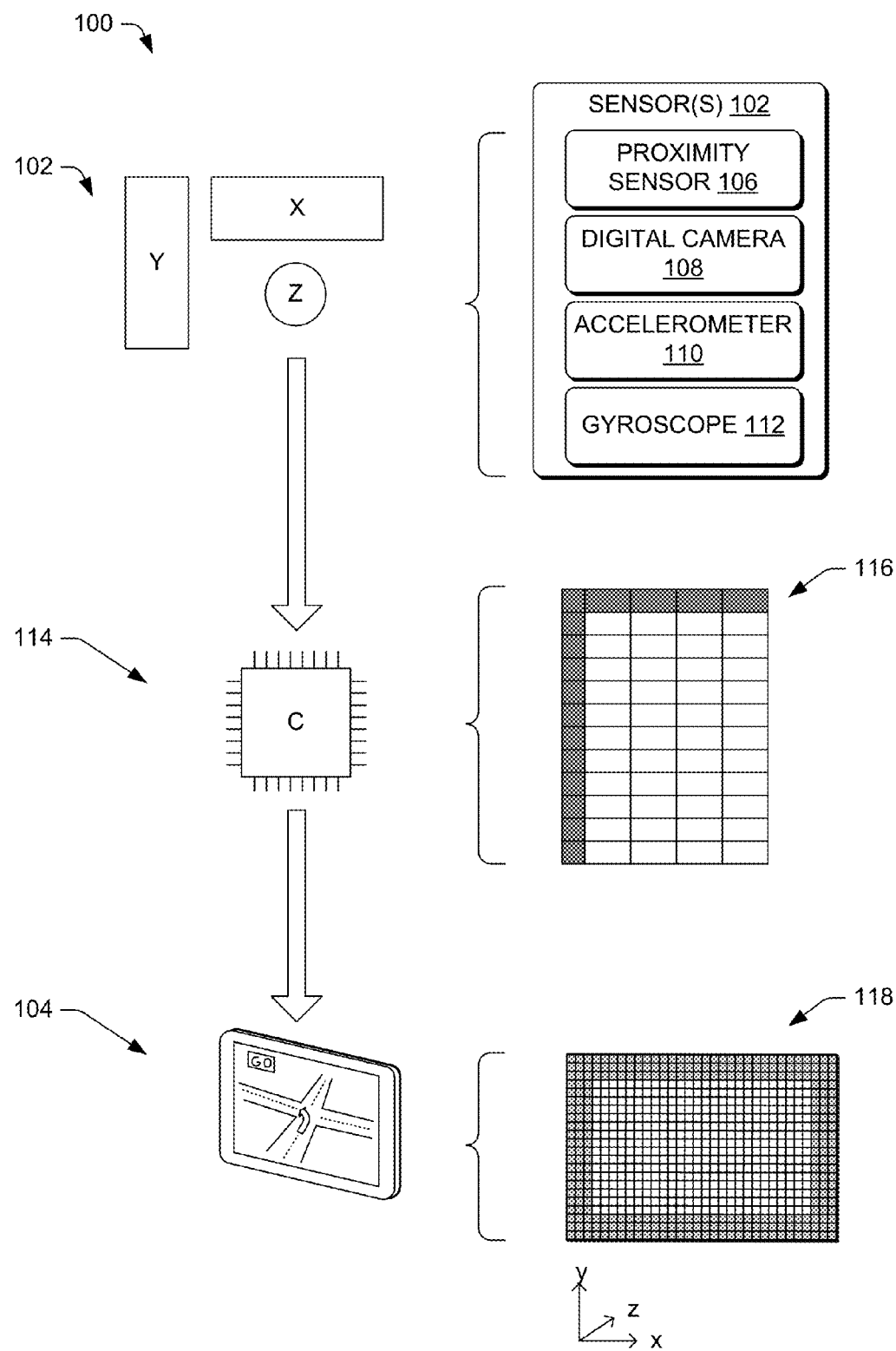
FIG. 1 is a schematic diagram of illustrative components of an electronic device that employs vibration sensing and canceling to minimize perceived movement or blur of text and images on a display.

This disclosure is directed at least in part to sensing movement of an electronic display and canceling perceived movement of content on the electronic display in response to the sensing. A controller, such as a processor or microcontroller, may include logic to reassign "physical pixels" to "image pixels" (or virtual pixels) such that the image appears to be stationary while the physical pixels are moving due to movement of the electronic display. For example, if the physical pixels are moving upward, the image pixels may be reassigned downward in an equal and opposite manner. The user's persistence of vision may then be reinforced by reassignment of the pixels by the controller. For example, text displayed on the electronic display may be more readable and images more easily viewed by a user.

The sensors may include sensors to detect and measure movement, such as an accelerometer, a gyroscope, a proximity sensor, a global positioning system (GPS) sensor, and/or other types of sensors capable of detecting movement. The movement may be a linear movement, an oscillation, a vibration, or any other type of movement of the electronic display.

By canceling or compensating for movement of the electronic display, a user may more clearly view or interpret information displayed by the electronic display. For example, a user may desire to read text on an electronic display while traveling on a bus. The user and the electronic display may experience movement while riding in the bus due to uneven road services, rapid acceleration/deceleration of the bus, or other forces that impact the user and/or the electronic device. The sensors may sense the movement of the electronic device, and in particular, of the electronic display. For example, when the bus hits a bump in the road, an accelerometer may determine that the electronic device is experiencing a rapid movement. A controller may interpret a signal directly from the sensor (e.g., the accelerometer, etc.) and may modify the display to cancel or reduce (electronically dampen) the user's perception of the movement of the electronic display. For example, when the device moves upward in response to a force (e.g., hitting a bump in the road, etc.), the controller may reassign pixels downward to shift content on the display downward, thus making the content appear to move less than an amount of movement of the display.

In various embodiments, the sensors may determine that the electronic display is subjected to an oscillation or vibration. The controller may interpret signals from the sensors, and in response, modify the display to minimize or remove perceived blur. As a result, the electronic display may be moving up and down (or side to side, etc.) while content on the electronic display appears to be stationary and not moving when viewed by a user. In various embodiments, a user may adjust a gain control to modify the compensation based on user preferences, thereby calibrating the compensation to best suit the user (e.g., reduce perceived blur or movement).

The techniques described herein may also be beneficial to use of a touch sensitive display. Therefore, besides enabling a user to more clearly view or interpret information displayed by the electronic display, the techniques described herein may also enable a user to more accurately select content, use a virtual keyboard on a user interface, or otherwise engage content on a moving electronic display when the electronic display is a touch sensitive display.

The techniques, apparatuses, and systems described herein may be implemented in a number of ways. Example implementations are provided below with reference to the following figures.

Illustrative Electronic Device

FIG. 1 is a schematic diagram of illustrative components 100 of an electronic device that employs vibration or movement sensing and canceling to minimize perceived movement or blur of text and images on a display. In the illustrated implementation, the components 100 may be incorporated in various types of electronic devices ("devices"), each of which includes a display. A non-exhaustive list of the devices may include portable devices and built-in devices. Portable devices may include a notebook computer, a music player, a personal digital assistant (PDA), a mobile telephone (including smartphones), a tablet computer, an electronic book (eBook) reader, a netbook computer, a wearable device (e.g., a watch, etc.), a navigational device, or a monitor (with or without a television tuner), and so forth. Built-in devices may include displays in an automobile control system, exercise equipment, large machinery control systems (e.g., metal shaping machines, laundry machines, etc.) aircraft control systems, water vessel control systems, and so forth. Virtually any type of electronic display device may be used and may be configured to adjust the rendering of content on a display by employing vibration or movement sensing and canceling based at least in part on sensor data and in accordance with the techniques described herein. In the description that follows, the terms "movement," "oscillation," and "vibration" may be used interchangeably.

As illustrated, the components 100 may include sensors 102 that sense movement of a display 104. The sensors 102 may include one or more of a proximity sensor 106, a digital camera 108, an accelerometer 110, and a gyroscope 112. However, other sensors that detect motion may also be used as discussed herein. In some embodiments, an accelerometer may be used to provide measurement of at least some of the six degrees of freedom (6-DOF). In various embodiments, the accelerometer may be used to measure the 6-DOF by measuring movement along three axes aligned with each of an x-axis, a y-axis, and a z-axis. For discussion purposes, the x-axis may refer to movement viewed as left/right by a user, the y-axis may refer to movement viewed as up/down by the user, and the z-axis may refer to movement viewed as toward/away from by the user. In some embodiments, the accelerometer may measure movement along only the x-axis and the y-axis. The accelerometer may output a voltage for each of the axes to indicate a magnitude and direction of the movement experienced by the accelerometer. The proximity sensor 106 and/or the digital camera 108 may be used to measure movement, such as movement along the z-axis. In some embodiments, the digital camera 126 may also measure movement along the x-axis and/or the y-axis using position tracking. For example, the digital camera 126 may operate similar to an optical mouse used in desktop computing. The digital camera may record low resolution imagery at a high frame rate greater than typical video production. The digital camera may then analyze the imagery to determine movement alone one or more of the axes.

In accordance with some embodiments, the sensors 102 may be located proximate, near, or adjacent to the display 104 to more accurately measure the movement of the display. The location of the sensors 102 may be particularly relevant when the electronic device is a built-in device that includes some components that are separate from the display 104, which may be common in instrumentation in vehicles, aircraft, or other large machines.

In accordance with various embodiments, a controller 114 may be in communication with the sensors 102 and the display 104. The controller 114 may be a processor, microcontroller, or other logical device that receives input from the sensors 102 and provides an output to the display 104 in response to the signals.

In accordance with various embodiments, the controller 114 may use a lookup table 116 to determine an output or outputs based on the signals from the sensors 102. For example, when the sensors 102 include an accelerometer that measures movement in each of the directions of movement (x, y, z directions), then the lookup table 116 may indicate a shift in pixel assignments as the output of the controller based at least in part on the magnitude and direction of the forces (or movement) measured by the sensors 102. The lookup table 116 may provide an output that indicates an adjustment to an electrical output of the controller 114 that is then communicated to the display 104. The output may cause reassignment of pixels 118 in the display 104, thereby causing rendered content on the display to move in a direction opposite the movement detected by the sensors. In some instances, the movement may be a stepwise movement, such as a first movement in a first direction (e.g., x-direction), and a second movement in a second direction (e.g., y-direction) or visaversa. In various embodiments, the controller 114 may shift pixel values, addresses or locations of the display to move the visual state of each pixel in a direction opposite of the movement measured by at least one sensor in response to receipt of the signals.

The display 104 may include a plurality of pixels 118 which are in communication with the controller via a grid of wires. The controller 114 may activate or deactivate each pixel. Each pixel may include one or more segments, which may be assigned to a color. For example a pixel may include a red portion, a green portion, and a blue portion, referred to as a RGB pixel. Each of the colors may be controlled independently by the controller 114 though activation or deactivation using a transistor for each portion of the pixel.

In some embodiments, the display 104 may include additional pixels that surround the display. The additional pixels may enable movement of the content in the display in accordance with the techniques described herein without loss of some of the content (e.g., content "falling off" the display after a movement).

The display 104 may be any type of electronic display, such as a liquid crystal display (LCD), a plasma display, a touch screen or touch sensitive display, an electronic paper display, a projection display, or other types of displays.

Figure 2:
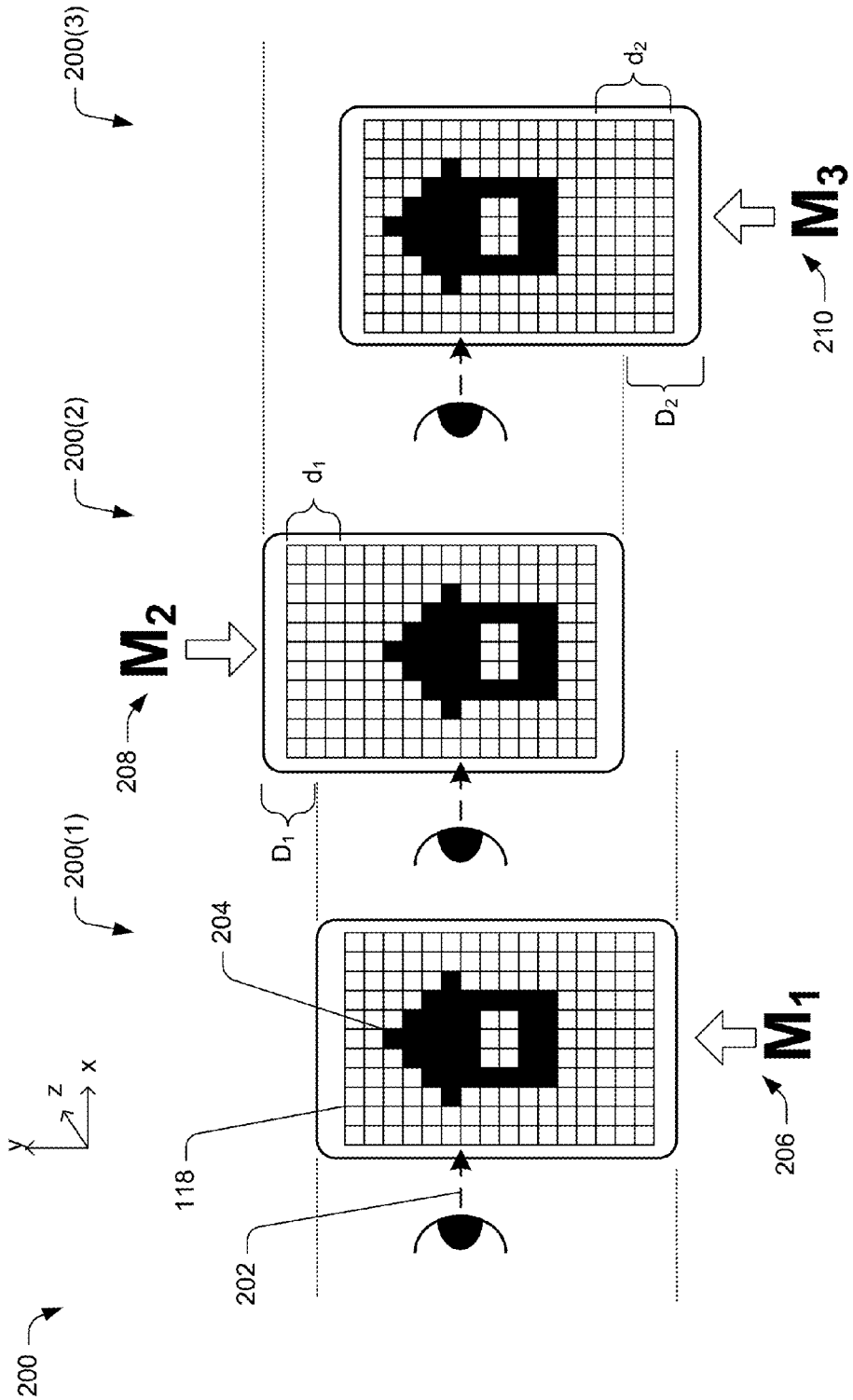
FIG. 2 is a schematic diagram of illustrative movement of a display and updated content on the display rendered in response to the movement.

FIG. 2 is a schematic diagram of illustrative movement profiles 200 (i.e. series of movements) of a display and updated content on the display rendered in response to the movement. The schematic diagram shows movement of the display 104 in a series of three movement profiles, which are used for discussion purposes. In accordance with various embodiments, the movement may be determined based on sensor data in at least one of three directions. Movement may be in each of an x-direction, y-direction, and z-direction, where the x-direction and y-direction are parallel to the display and perpendicular to one another and the z-direction is perpendicular to the display.

A first movement profile 200(1) shows the display 104 with respect to a line of sight 202 of a user. For discussion purposes, the line of sight is assumed to be static while the display 104 is assumed to move relative to both the user and line of sight 202. By measuring the movement using the sensors, displayed content 204 may be updated by the controller 114 to appear to be stationary or nearly stationary with respect to the line of sight 202 of the user.

The display 104 may be subjected to a movement $M_1$ 206 (a force, a vector, etc.), which may cause movement of the display along the y-axis (or another direction). The movement $M_1$ 206 may be detected and quantified by the sensors 102, such as to determine an amount of the movement, magnitude of the movement, and/or a direction of the movement. A resulting movement of the display 104 and the location of the content 204 within the display are shown in the second movement profile 200(2). In the second movement profile 200(2), the display 104 has moved in the y-direction a distance $D_1$. With respect to the line of sight 202, the content 204 has been updated on a lower portion of the display 104, and thus does not appear to move from the perspective of the user. However, the controller 114 has moved the content downward in the display 104 an equal and opposite distance $d_1$ (shown as additional pixels in the top portion of the display 104). For example, the controller 114 may move the content 204 within the display 104 by reassigning pixels using pixel assignment information determined based at least in part on the sensor data. The reassignment may be realized after an updating of the display 104 by the controller 114.

The display 104 may then be subjected to another movement $M_2$ 208, which may cause movement of the display along the y-axis (or another direction), such as when the display is vibrating or oscillating. A resulting movement of the display 104 and the location of the content 204 within the display are shown in the third movement profile 200(3). In the third movement profile 200(3), the display 104 has moved in the negative y-direction a distance $D_2$. With respect to the line of sight 202, the content 204 has been updated on an upper portion of the display 104, and thus does not appear to move from the perspective of the user. However, the controller 114 has moved the content upward in the display 104 an equal and opposite distance $d_2$ (shown by inclusion of additional pixels in the bottom portion of the display 104). The display 104 may then be subjected to yet another movement $M_3$ 210, which may result in further updates to the position of the content on the display.

Figure 3:
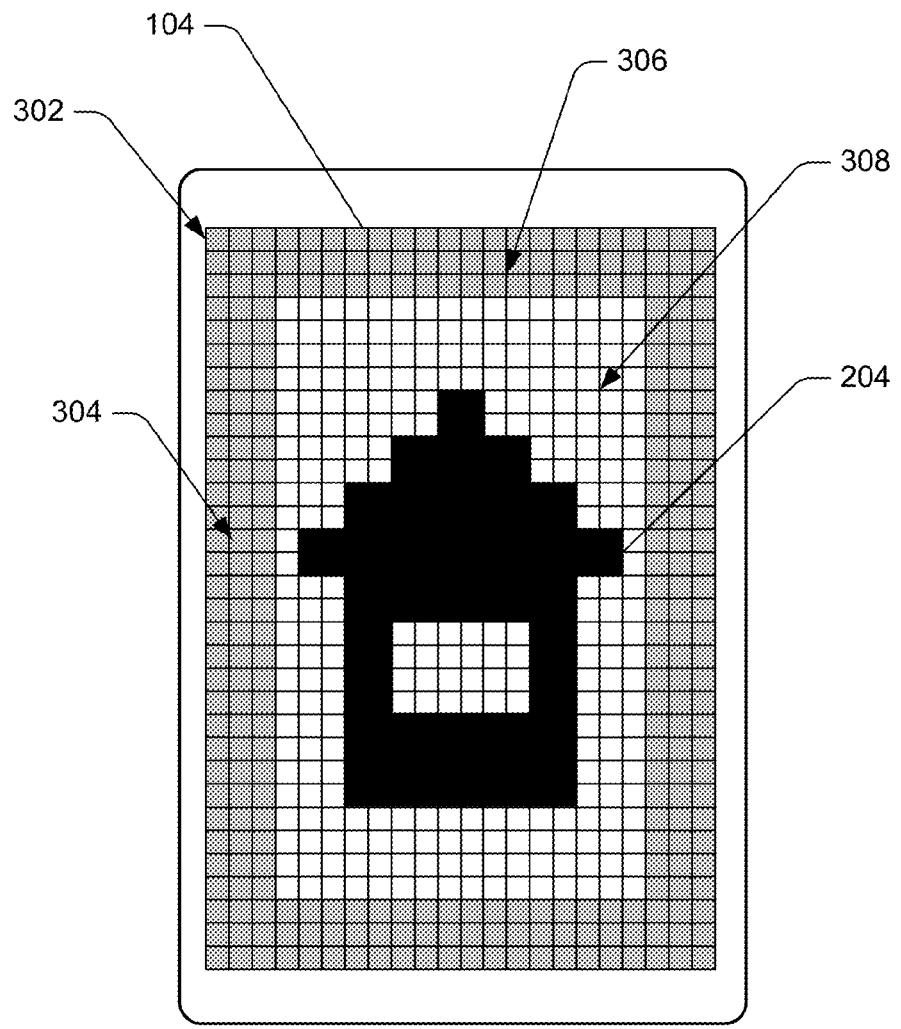
FIG. 3 is a schematic diagram showing additional pixels in the display that act as a buffer and enable movement of content within the display without losing view of the content.

FIG. 3 is a schematic diagram showing illustrative additional pixels 302 in the display 104 that act as a buffer and enable movement of the content 204 within the display 104 without losing view of the content. To accommodate this movement, in some embodiments, the display 104 may include the additional pixels 302 (buffer pixels) which may be selectively activated to enable movement of the content without the content figuratively "falling off" the display 104. The additional pixels 302 may be a predetermined amount of additional pixels, such as a buffer of an additional number of pixels in the y-direction 304 and an additional number of pixels in the x-direction 306. When the device is stationary, the content 204 may be displayed in a default middle location 308 that is surrounded by the additional pixels 302.

Illustrative Operation

Figure 4:
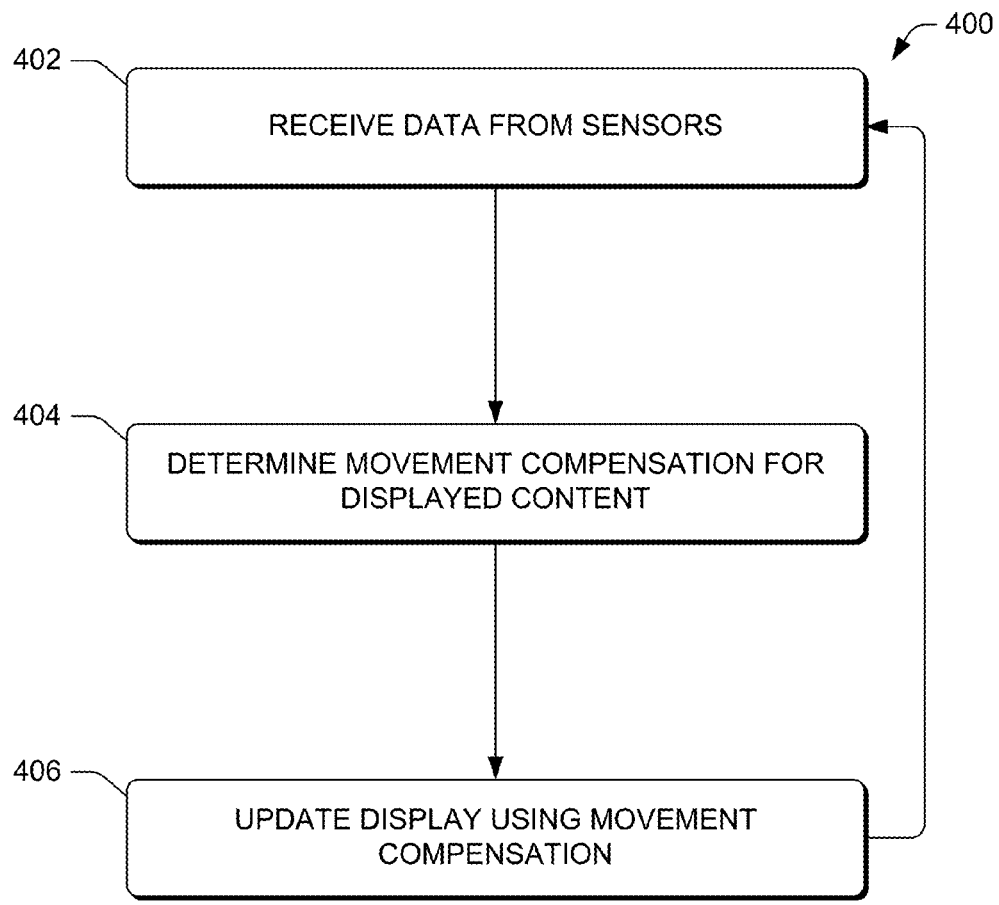
FIG. 4 is a flow diagram of an illustrative process to update a location of content on a display of the electronic device based at least in part on signals from sensors that indicate movement of the display.
Figure 5:
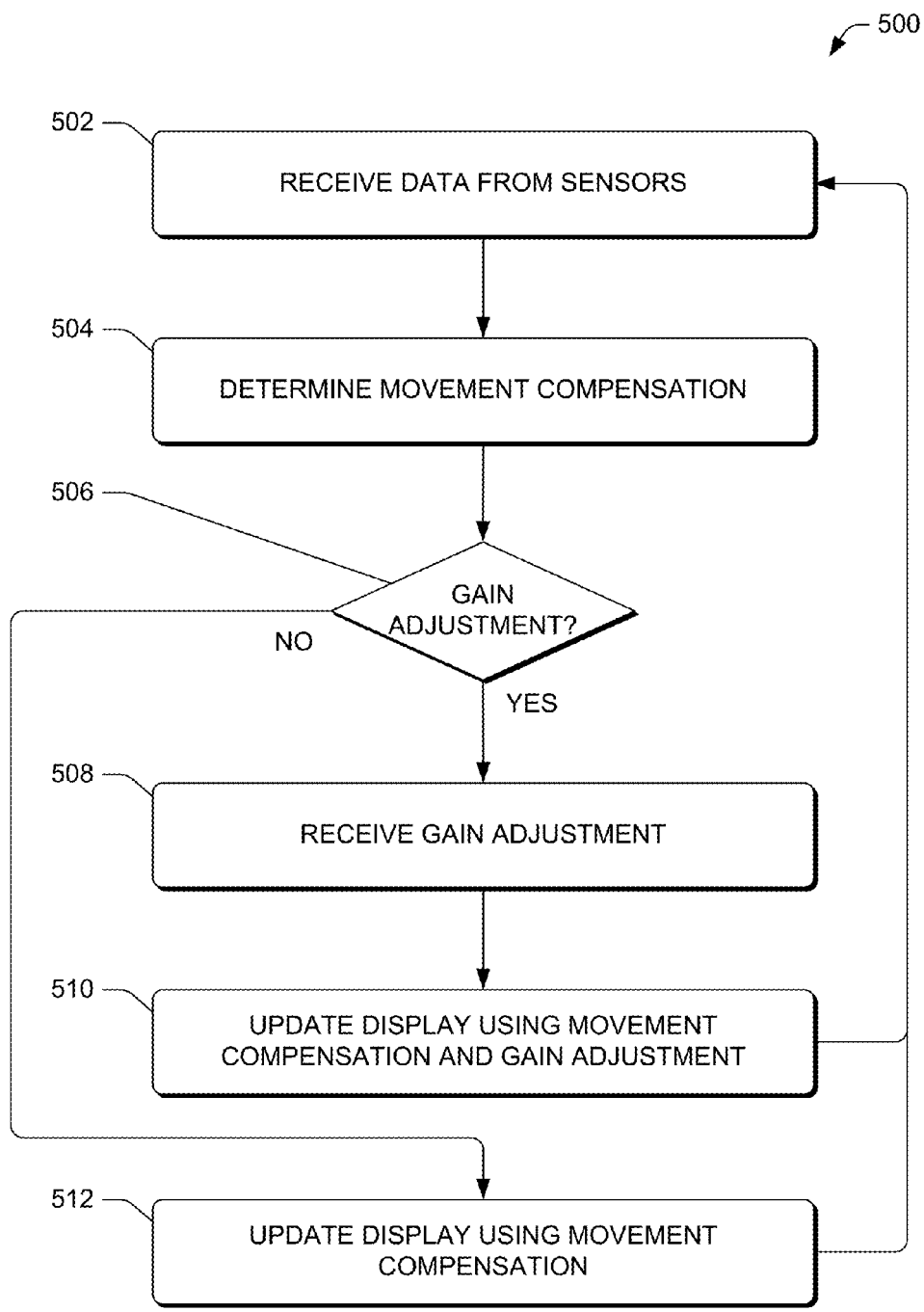
FIG. 5 is a flow diagram of an illustrative process to update a display of the electronic device based at least in part on signals from sensors that indicate movement of the display and a gain adjustment.

FIGS. 4 and 5 show illustrative processes to provide vibration sensing and canceling for a display. The processes are illustrated as a collection of blocks in a logical flow graph, which represent a sequence of operations that can be implemented in hardware, software, or a combination thereof. The order in which the operations are described is not intended to be construed as a limitation, and any number of the described blocks can be combined in any order and/or in parallel to implement the processes.

FIG. 4 is a flow diagram of an illustrative process 400 to update a location of content on a display based at least in part on signals from sensors that indicate movement of the display.

At 402, the controller 114 may receive motion data from the sensors 102. For example, the controller 114 may receive motion data from one or more accelerometer 110 that indicate a direction and magnitude of a movement, force, or vector. The controller 114 may compile information from various types of sensors, such as the proximity sensor 106, the digital camera 108, the accelerometer 110, and the gyroscope 112 to increase an accuracy of the movement, force, or vector. As discussed above, the movement of the display 104 may be caused by many different external factors (e.g., a bumpy road, movement of a machine, turbulence, waves in rough waters, and so forth). Other factors may also cause movement in the display 104, such as human induced movement from a user with hands that tremble when holding the display 104.

At 404, the controller 114 may determine a movement compensation for content displayed by the device based at least in part on the received data from the sensors 102. For example, the controller 114 may determine pixel assignment information to move the content 204 in an equal (or substantially equal) and opposite distance (e.g., $d_1$ shown in FIG. 2a.) as a movement sensed by the sensors 102 at the operation 402. When the sensed movement of the display 104 is a relatively large movement, the controller 114 may be constrained in an amount of pixels that the content 204 can be moved, and therefore, may not move the content an equal amount as the actual movement.

At 406, the controller 114 may update the display 104 to present the content 204 in the new position based at least in part on the determined movement compensation determined in the operation 404. The updating may occur at fixed intervals, such as every x number of microseconds or Hertz, clock cycles (refresh rate of the display, etc.). In various embodiments, the controller 114 moves the visual state of each pixel during a clock cycle prior to update of content on the display that is rendered by software.

In some embodiments, the updating the display 104 may also update a touch sensitive area defined on the display for one or more selections of various portions of the content 204. For example, when the display 104 is a touch sensitive display, the areas on the display that are assigned to inputs (e.g., letters on a keyboard, links, etc.) may also be moved and updated based at least in part on the determined movement compensation from the operation 404. Thus, a user may be able to make accurate selections on a device even when the display is moving, such as making accurate selections on a touch sensitive navigational display while a user is driving on a rough road that causes the display to shake or move back and forth.

FIG. 5 is a flow diagram of an illustrative process 500 to update a display of the electronic device based at least in part on signals from sensors that indicate movement of the display and a gain adjustment. The process 500 includes a gain adjustment to enable compensation when both the user and device experience vibration. However, the vibration of the user and the device may not be equal, thus creating a desire to have the controller 114 compensate, at least partially, for the movement of the display 104.

At 502, the controller 114 may receive data from the sensors 102 as described above with reference to the operation 402.

At 504, the controller 114 may determine movement (vibration, oscillation, etc.) compensation as described above with reference to the operation 404.

At 506, the controller 114 may determine whether to adjust the compensation determined at the operation 504 using a gain adjustment. For example, the user may be able to "tune" a gain adjustment to modify the compensation determined at the operation 504. For example, a first user may perceive or experience a different vibration or frequency of vibration of the display 104 than a second user because of the movement of the first user may be different than the movement of the second user. The difference in movement may be attributed to various factors, such as the size of the users (longer/shorter arms holding device, etc.), strength, susceptibility to movement, or for other reasons. Thus, these differences may be compensated by adjusting a gain adjustment, which may then calibrate or align a movement of the device with movement of the user. The gain adjustment may be implemented as a dial control or other type of relative controller that, when used by the user, may offset the compensation determined in the operation 504. In some embodiments, the gain adjustment may be a multiplier that modifies at least one of a delay before implementing movement compensation or the gain adjustment may modify a number of pixels determined for a move of the content. The gain adjustment (gain controller) may be in communication with the controller 114.

When the controller 114 receives data from the gain adjustment (following the "yes" route from the operation 506), then the process 500 may advance to an operation 508 and continue processing.

At 508, the controller 114 may receive the gain adjustment. For example, the user may select or adjust the gain adjustment using a gain controller included with the device, which may be a physical controller (e.g., a dial, slider, etc.) or a software control accessible via a user interface using the display 104.

At 510, the controller 114 may update the display 104 to present the content 204 in the new position based at least in part on the determined movement compensation determined in the operation 504 and using any offset of a gain adjustment received from the operation 508. In some embodiments, the selection of the gain adjustment may be performed using a trial and error process where the user adjusts the gain until a blur or perceived movement of the content decreases or disappears.

When the controller 114 does not include (or use) the gain adjustment (following the "no" route from the operation 506), then the process 500 may advance to an operation 512. At 512, the controller 114 may update the display 104 to present the content 204 in the new position based at least in part on the determined movement compensation determined in the operation 504 and without using any offset of a gain adjustment.

Illustrative Movement and Compensation

Figure 6:
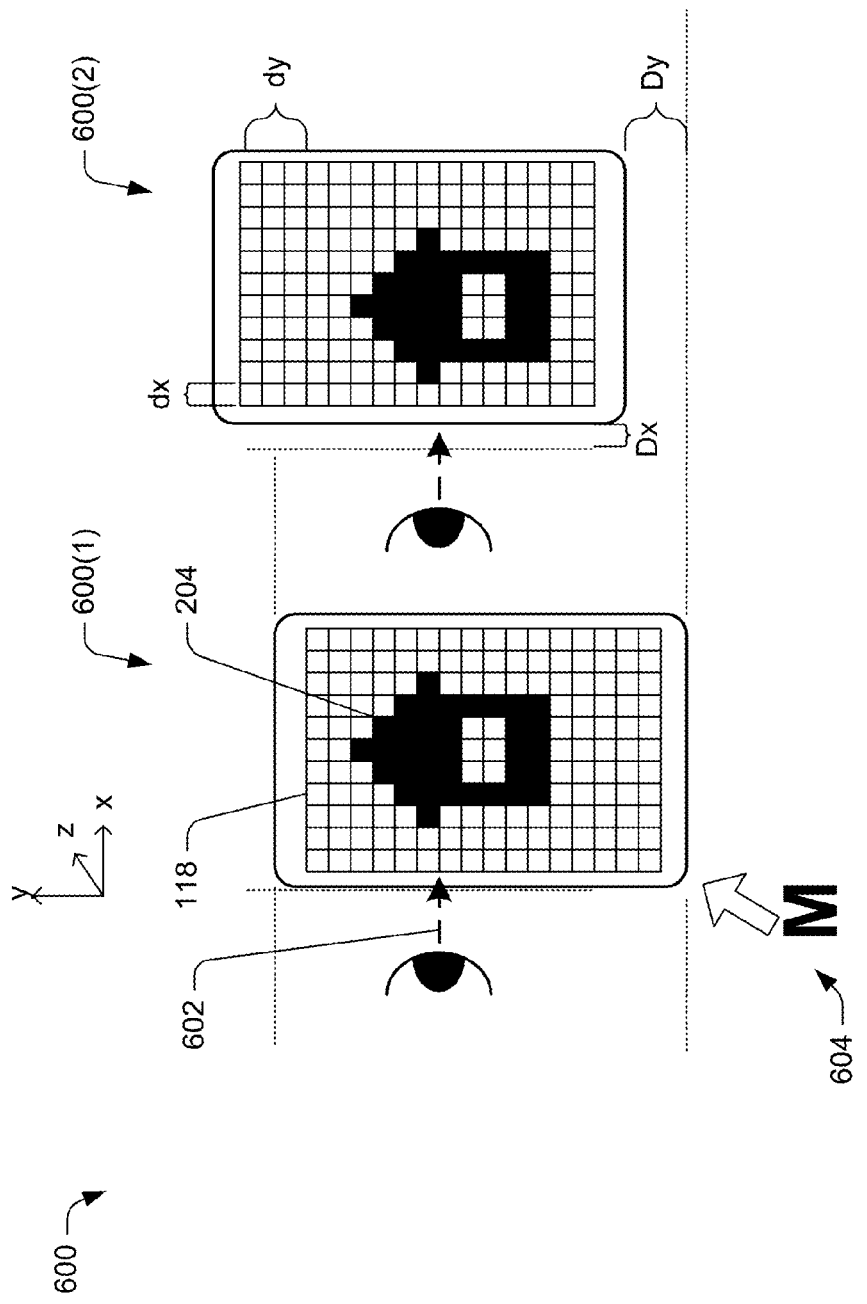
FIG. 6 is a schematic diagram of illustrative diagonal movement of a display and updated content on the display rendered in response to the diagonal movement.

FIG. 6 is a schematic diagram of illustrative diagonal movement profiles 600 (i.e. series of movements) of a display and updated content on the display rendered in response to the diagonal movement. The schematic diagram shows movement of the electronic display 104 in a series of two movement profiles, which are used for discussion purposes.

A first movement profile 600(1) shows the display 104 with respect to a line of sight 602 of a user. For discussion purposes, the line of sight is assumed to be static while the display 104 is assumed to move relative to both the user and line of sight 602. By measuring the movement using the sensors, displayed content 204 may be updated by the controller 114 to appear to be stationary or nearly stationary with respect to the line of sight 602 of the user.

The display 104 may be subjected to a movement M 604 (a force, a vector, etc.), which may cause movement of the display along multiple axes. For example, the movement M 604 may have components of movement and magnitude in one or more of the x-direction, the y-direction, and/or the z-direction. The movement M 604 may be detected and quantified by the sensors, such as to determine an amount of the movement, magnitude of the movement, and/or a direction of the movement. A resulting movement of the display 104 and the location of the content 204 within the display are shown in the second movement profile 600(2). In the second movement profile 600(2), the display 104 has moved in the y-direction a distance Dy and in the x-direction a distance Dx. With respect to the line of sight 602, the content 204 has been updated on a lower-left portion of the display 104, and thus does not appear to move from the perspective of the user. However, the controller 114 has moved the content downward and to the left in the display 104 an equal and opposite distance dy and dx (shown as additional pixels in the top-right portion of the display 104). In some embodiments, the controller 114 may move in one direction at a time, such as to implement a stepwise movement of the display (move in x-direction then in y-direction or vice-versa). For example, the controller 114 may move the content 204 within the display 104 by reassigning pixels using pixel assignment information determined based at least in part on the sensor data. The reassignment may be realized after a updating of the display 104 by the controller 114. In some embodiments, the movement in multi-directions may be performed by calculating movements as components of the x-direction, the y-direction, and/or the z-direction, as illustrated in FIG. 6.

Illustrative Display

Figure 7:
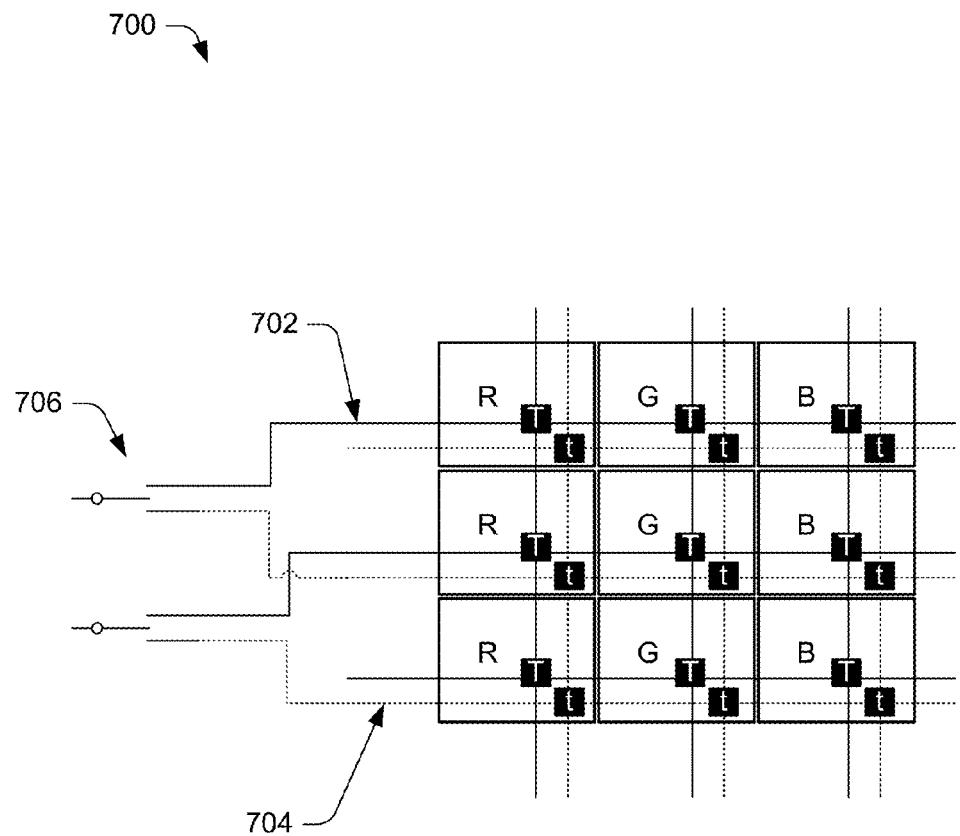
FIG. 7 is a schematic diagram of an illustrative display including wiring of pixels to enable reassignment of pixels in multiple directions.

FIG. 7 is a schematic diagram of illustrative display 700 including illustrative wiring of pixels to enable reassignment of pixels in multiple directions. A typical display includes connector wires 702 (shown with solid lines in FIG. 7), which include a first connector and a second connector. When activated, a transistor (T) at a junction of the connector wires 702 may be set or adjusted to change a state of the pixel associated with the transistor (T).

Existing pixelated displays such as LCDs include a mechanism which transports the information to be displayed by each pixel along a linear electrical connection which is able to move display information in one direction of one major axis. (i.e., move pixels to the right only, to the left only, upward only, downward only). This design is an artifact of optimizing the number of electrical connections required to the pixels. Modification of these connections may be made to make the connections capable of movement (reassignment) of pixels to be bidirectional, exist for both major axes (x and y axes, horizontal and vertical), or move in other directions and amounts.

Adding the connector wires and transistors to a plane of the display 700 may consume some of the light-emitting space in an LCD. Thus, there may be a trade-off with display brightness. In some embodiments, an extra set of connector wires 704 which link to an additional set of transistors (t) for each pixel may be added to the display 700. In some embodiments, reassignment of the pixels may be performed by the controller by use of a switch 706, which when activated, may shift content from one set of pixels to another set of pixels using the connector wires 702 and the extra set of connector wires 704.

Additional sets of the extra wires and transistors may be added to the display 700 to enable movement in each of the four directions along the x-axis and the y-axis. However, not all directions may be necessary. For some applications, such as automobile dashboard, there is a reason to expect most vibrations to be along a single axis (e.g., in a car dashboard, vertical shaking transmitted from the road surface via the suspension). In those applications, added brightness may be achieved by cancelling vibrations only in the vibration-dominant axis.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. An electronic device comprising:
a display having a plurality of pixels;
an accelerometer with at least two orthogonal axes to generate voltage to indicate a direction and magnitude in response to a particular movement of the display;
a gain controller to tune a gain adjustment; and a controller in communication with the accelerometer and the display, the controller to:
receive the voltage from the accelerometer;
in response to receipt of the voltage, reassign pixel values to cause a shift in content on the display in a direction opposite of the particular movement measured by the accelerometer such that the shift in content compensates at least in part for the particular movement measured by the accelerometer; and
selectively implement movement compensation based at least in part on the gain adjustment.

2. The electronic device as recited in claim 1, wherein the controller reassigns the pixel values during a clock cycle prior to update of content on the display that is rendered by software executed by the electronic device.

3. The electronic device as recited in claim 1, wherein the gain adjustment includes a multiplier that, when implemented by the controller, modifies a delay before the controller causes the shift in content on the display.

4. The electronic device as recited in claim 1,
wherein for the gain controller to tune the gain adjustment includes the gain controller to receive the gain adjustment while the controller implements movement compensation such that the effect of the gain adjustment on the movement compensation is contemporaneously perceivable.

5. An electronic device comprising:
a display having a plurality of pixels that, when activated or deactivated, change a visual state;
one or more sensors to generate signals based at least in part on a particular movement of the display;
a gain controller to tune a gain adjustment; and
a controller in communication with the gain controller, the one or more sensors and the display, the controller to:
receive the signals from the one or more sensors; and
selectively reassign pixel addresses to compensate at least in part for the particular movement of the display by changing the visual state of individual pixels of the plurality of pixels to shift content on the display in a direction opposite of the particular movement measured by the one or more sensors in response to receipt of the signals; and
selectively implement movement compensation based at least in part on the gain adjustment.

6. The electronic device as recited in claim 5, wherein one or more sensors include at least one of an accelerometer, a gyroscope, or a proximity detector.

7. The electronic device as recited in claim 5, wherein:
the one or more sensors provide the signals that quantify movement in each of an x-direction and a y-direction, the x-direction and the y-direction being substantially parallel to the display and perpendicular to one another; and
the controller selectively reassigns pixel addresses such that content on the display shifts in at least one of the x-direction or the y-direction.

8. The electronic device as recited in claim 5, wherein the display is a touch screen display.

9. The electronic device as recited in claim 5, wherein the gain adjustment, when implemented by the controller, causes a delay before changing the visual state of individual pixels of the plurality of pixels to shift content on the display, the delay being modified as the gain adjustment is tuned.

10. The electronic device as recited in claim 5, wherein:
the display is a dashboard mounted display in a vehicle; and the controller selectively reassigns
pixel addresses such that content on the display shifts in a direction of upward or downward with respect the display.

11. The electronic device as recited in claim 5, wherein the one or more sensors provide a direction and a magnitude of the particular movement of the display.

12. The electronic device as recited in claim 5, wherein the controller changes the visual state of individual pixels of the plurality of pixels during a clock cycle prior to update of content on the display that is rendered by software.

13. The electronic device as recited in claim 5, wherein the controller changes the visual state of individual pixels of the plurality of pixels in a single direction during individual updates of the visual state.

14. The electronic device as recited in claim 5, wherein individual pixels of the plurality of pixels are coupled to at least two transistors such that content on the display is capable of being shifted in at least two directions to compensate at least in part for the particular movement of the display.

15. An apparatus comprising:
a display having a plurality of pixels;
one or more sensors to measure a particular movement of the display;
a gain controller to tune a gain adjustment; and
a controller in communication with the display and the one or more sensors, the controller to:
receive signals from the one or more sensors;
compensate at least in part for the particular movement of the display by reassigning pixel addresses to cause content on the display to move in a direction opposite of the particular movement of the display measured by the one or more sensors, wherein the compensation is based at least in part on the received signals; and
implement movement compensation based at least in part on the gain adjustment.

16. The apparatus as recited in claim 15, wherein the one or more sensors include at least one of a gyroscope, an accelerometer, or a proximity sensor.

17. The apparatus as recited in claim 15, wherein the display includes additional pixels that surround at least a portion of the display, the additional pixels to allow movement of the content into the additional pixels without loss of the content after the movement.

18. The apparatus as recited in claim 15, wherein the gain adjustment is a multiplier that modifies at least one of a delay before implementing the movement compensation or a number of pixels included in the movement.

19. The apparatus as recited in claim 15, wherein the controller reassigns the pixel addresses during a clock cycle prior to update of content on the display that is rendered by software.

* * * * *